(12) United States Patent
Santo et al.

(10) Patent No.: US 8,653,771 B2
(45) Date of Patent: Feb. 18, 2014

(54) CONTROLLER FOR MOTOR

(75) Inventors: Shinji Santo, Kosai (JP); Seiya Yokoyama, Toyohashi (JP); Yoji Yamada, Hamamatsu (JP); Yoshiaki Takemoto, Toyohashi (JP); Shigemasa Kato, Toyohashi (JP); Kenta Goto, Hamamatsu (JP)

(73) Assignee: ASMO Co., Ltd. (JP)

( * ) Notice: Subject to any disclaimer, the term of this patent is extended or adjusted under 35 U.S.C. 154(b) by 398 days.

(21) Appl. No.: 13/028,990

(22) Filed: Feb. 16, 2011

(65) Prior Publication Data

US 2011/0204833 A1 Aug. 25, 2011

(30) Foreign Application Priority Data

Feb. 25, 2010 (JP) ................................. 2010-040938

(51) Int. Cl.
*H02P 6/10* (2006.01)
(52) U.S. Cl.
USPC ............. 318/400.23; 318/400.02; 318/400.41
(58) Field of Classification Search
USPC .................. 318/700, 400.01, 400.02, 400.23, 318/400.24, 400.41, 491
See application file for complete search history.

(56) References Cited

U.S. PATENT DOCUMENTS 6,727,675 B2 * 4/2004 Yoshimoto et al. ........... 318/700
6,861,813 B2 * 3/2005 Yoshimoto et al. ........... 318/432

FOREIGN PATENT DOCUMENTS

| JP | 09-327139 | 12/1997 |
| JP | 2002-078370 | 3/2002 |
| JP | 2005-057935 | 3/2005 |
| JP | 2007-267466 | 10/2007 |

OTHER PUBLICATIONS

Official Action for Japanese Patent Application No. 2010-040938, mailed Nov. 26, 2013, 2 pages (untranslated).

* cited by examiner

*Primary Examiner* — Bentsu Ro
(74) *Attorney, Agent, or Firm* — Sheridan Ross P.C.

(57) ABSTRACT

A controller for use with a motor including a stator, around which three-phase coils are wound, and a rotor, which includes a magnet functioning as a first magnetic pole and a salient pole of a core functioning as a second magnetic pole. The controller supplies the three-phase coils with excitation currents having a predetermined phase difference from one another to drive and rotate the rotor. The controller includes a current adjustment unit that adjusts a fundamental wave current using high-order currents for third order and ninth order components in a q-axis to reduce torque ripple. The excitation current is generated based on the fundamental wave current adjusted by the current adjustment unit.

7 Claims, 10 Drawing Sheets

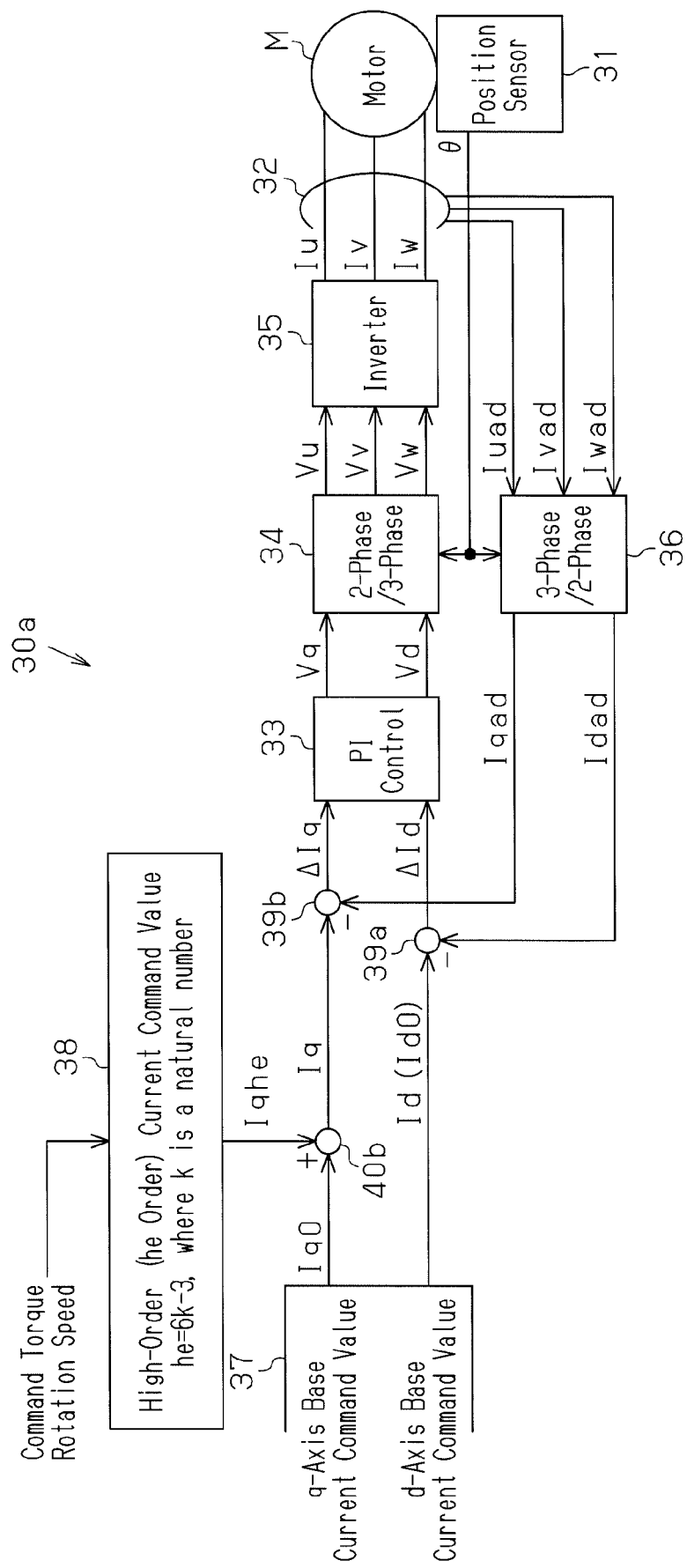

CONTROLLER FOR MOTOR

BACKGROUND OF THE INVENTION

The present invention relates to a controller for a motor including a so-called consequent pole rotor that reduces the number of magnets by half by using a magnet for only one of two different magnetic poles and using a salient pole of a core as a substitute for the other magnetic pole.

A so-called consequent pole motor (also referred to as a half magnet motor) is advantageous for saving resources and costs. The consequent pole motor includes a rotor that uses a magnet for only one of the magnetic poles to reduce the number of magnets by half. A salient pole of a rotor core is used as a substitute for the other magnetic pole (refer to, for example, Japanese Laid-Open Patent Publication No. 9-327139)

In such a consequent pole motor, the salient pole itself does not have a magnetic flux compelling force (induction). Thus, depending on the present positional relationship between the salient pole and the teeth of the opposing stator, the magnetic flux at the rear side of the magnet may not be evenly diffused from a circumferentially central part of the magnet to the salient poles at opposite sides of the magnet. Rather, the magnetic flux may be greatly induced toward the salient pole that presently has a smaller magnetic resistance. In such a case, the present magnetic flux directivity and the magnetic flux amount also change. Thus, the waveform of the magnetic flux differs between a salient pole portion and a magnet portion thereby causing the rotor to be magnetically unbalanced. When fundamental wave current (sinusoidal current) is supplied to the consequent pole motor in the same manner as a motor that uses a normal rotor having magnetic poles that all formed by magnets, this would increase torque ripple and vibration noise. It is desirable that such a state be improved.

SUMMARY OF THE INVENTION

It is an object of the present invention to provide a controller for a consequent pole motor that reduces torque ripple.

One aspect of the present invention is a controller for use with a motor including a stator, around which three-phase coils are wound, and a rotor, which includes a magnet functioning as a first magnetic pole and a salient pole of a core functioning as a second magnetic pole, for supplying the three-phase coils with excitation currents having a predetermined phase difference from one another to drive and rotate the rotor. The controller includes a current adjustment unit that adjusts a fundamental wave current using high-order currents for third order and ninth order components in a q-axis to reduce torque ripple. The excitation current is generated based on the fundamental wave current adjusted by the current adjustment unit.

A further aspect of the present invention is a controller for use with a motor including a stator, around which three-phase coils are wound, and a rotor, which includes a magnet functioning as a first magnetic pole and a salient pole of a core functioning as a second magnetic pole, for supplying the three-phase coils with excitation currents having a predetermined phase difference from one another to drive and rotate the rotor. The controller includes a current adjustment unit that adjusts a fundamental wave current using a high-order current of an he order component in, among a d-axis and a q-axis, at least the q-axis to reduce torque ripple, in which he=6k−3 and k is a natural number. The excitation currents are generated based on the fundamental wave current adjusted by the current adjustment unit.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is a block diagram of a controller according to the second embodiment of the present invention;

DETAILED DESCRIPTION OF THE PREFERRED EMBODIMENTS

First Embodiment

A first embodiment according to the present invention will now be discussed with reference to the drawings.

Figure 1:
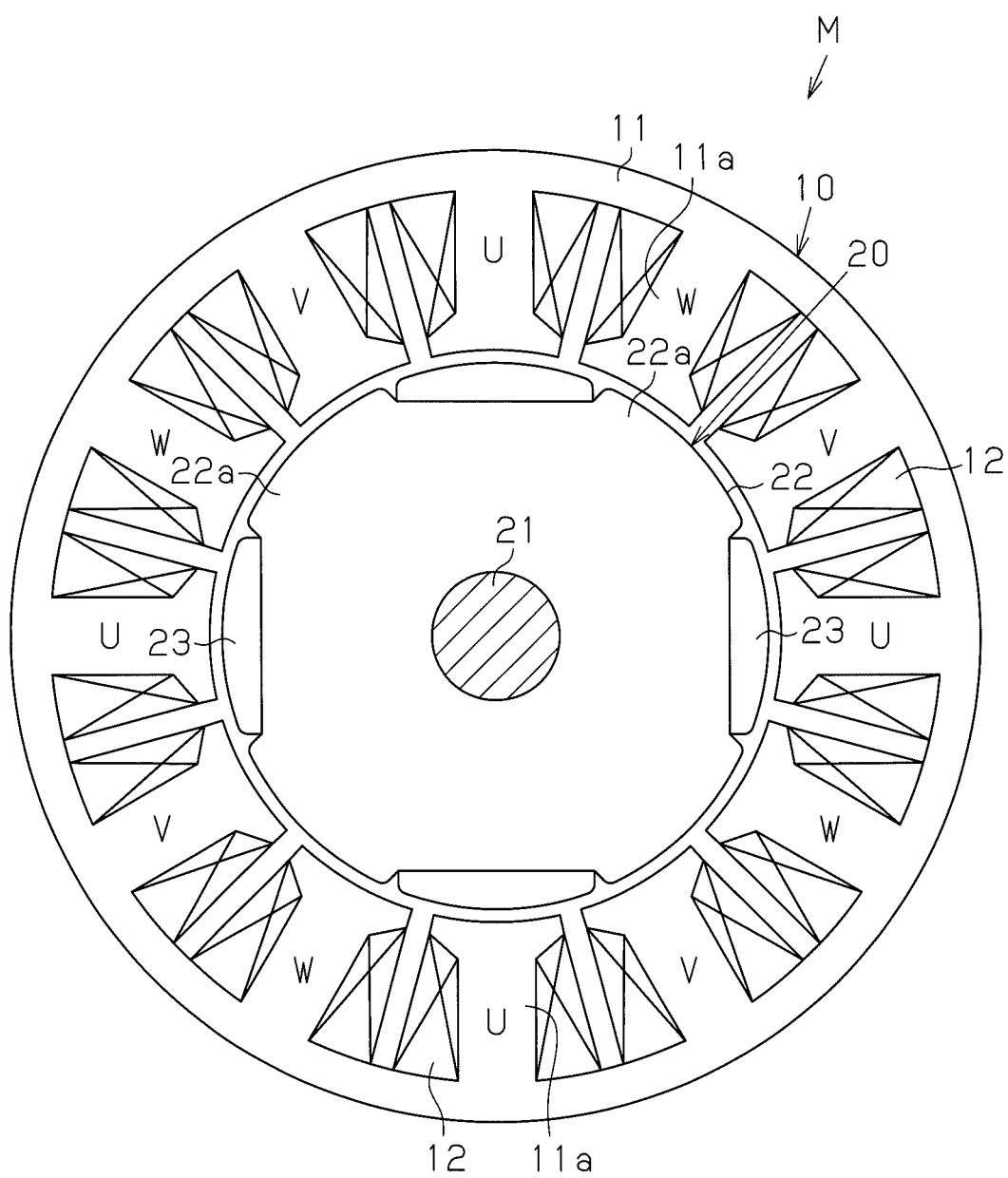
FIG. 1 is a diagram showing the structure of a consequent pole type brushless motor according to first to fourth embodiments of the present invention.

As shown in FIG. 1, a motor M of the present embodiment is of an inner rotor type and includes a stator 10 and a rotor 20, which is rotatably accommodated inside the stator 10. The stator 10 includes an annular stator core 11, which is formed from a magnetic metal, and twelve coils 12, which are wound as a concentrated winding around twelve teeth 11a arranged at equal angular intervals on the stator core 11. The twelve coils 12 are arranged in order as a U-phase coil, a W-phase coil, and a V-phase coil in the clockwise direction in FIG. 1. The coils 12 are supplied with excitation currents Iu, Iw, Iv for a U-phase, W-phase, and V-phase, respectively. The U-phase, W-phase, and V-phase have phase differences of 120° from one another.

The rotor 20 includes a rotation shaft 21, a rotor core 22 formed from a magnetic metal and fixed to the rotation shaft 21, and four magnets 23 fixed to the outer surface of the rotor core 22. Four salient poles 22a, each having a size that is substantially equal to the size of the magnets 23, are integrally arranged on the rotor core 22 at equal angular intervals. The magnets 23, of which surfaces define N poles, are fixed to a main body of the rotor core 22 and positioned between the salient poles 22a that are adjacent in the circumferential direction. In this manner, the magnets 23 and the salient poles 22a are alternately arranged in the circumferential direction. Further, the magnets 23 each function as the N pole, which is one of the two different magnetic poles, and the salient poles 22a each function as the S pole, which is the other one of the magnetic poles. The rotor 20 is a consequent pole type rotor including eight magnetic poles.

Figure 2:
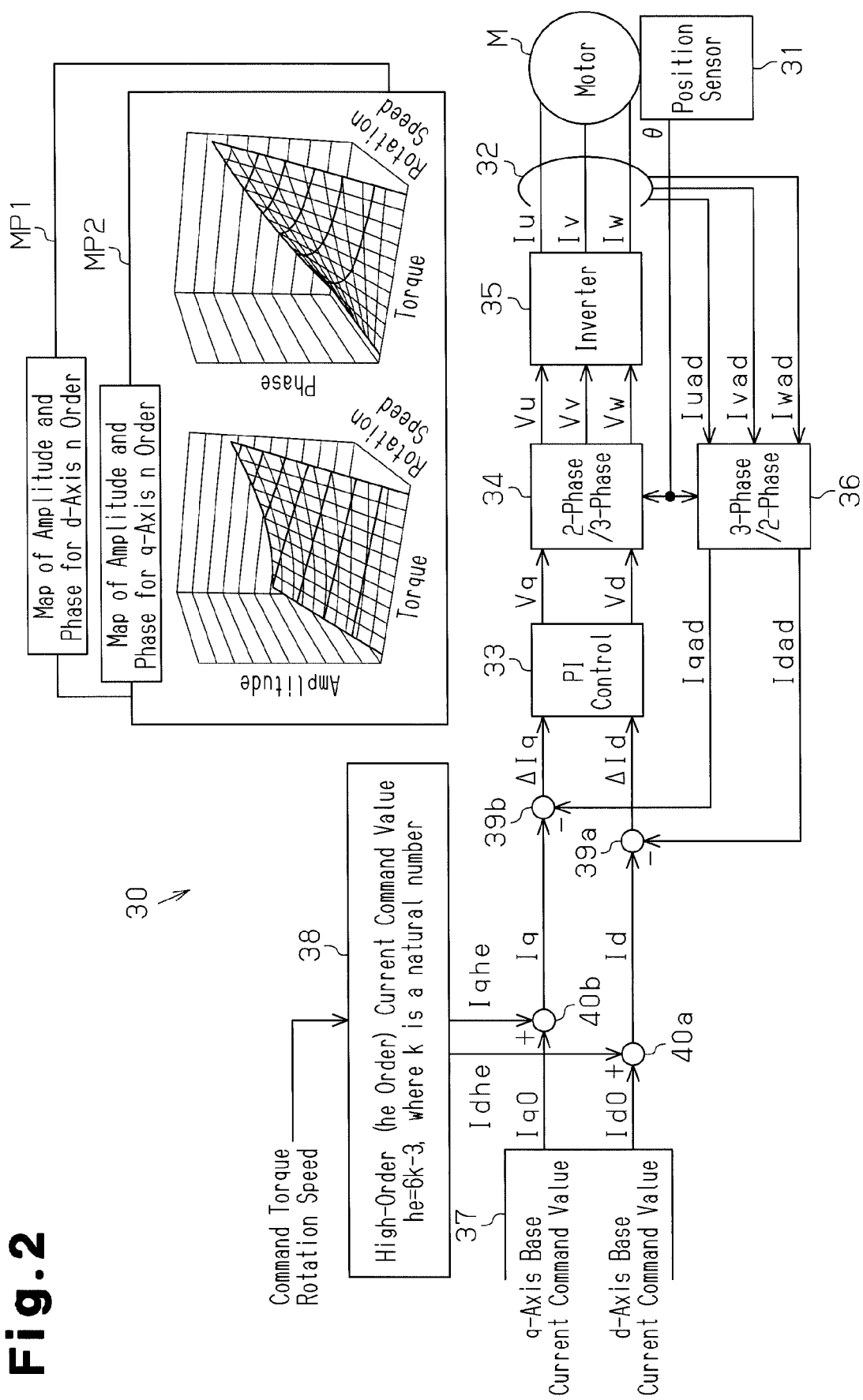
FIG. 2 is a block diagram of a controller according to the first embodiment of the present invention.

FIG. 2 shows a controller 30, which controls rotation of the motor M. The controller 30 generates the excitation currents Iu, Iv, Iw to supply the coil 12 for each of the U-phase, V-phase, and W-phase and thereby generate a rotation magnetic field with the stator 10 to rotate the rotor 20. Further, the controller 30 executes control so that the excitation currents Iu, Iv, Iw are in a state (amplitude and phase) that is suitable for the present situation. When executing such a control, the controller 30 uses a detection signal (rotation position θ) from a position sensor 31 to determine the rotation position of the rotor 20. The controller 30 also uses detection signals (actual current detection values Iuad, Ivad, Iwad) from a current sensor 32 to determine the excitation currents Iu, Iv, Iw for each phase supplied to the motor M.

The controller 30 includes a proportional integral (PI) control unit 33, a two-phase/three-phase converter 34, an inverter 35, a three-phase/two-phase converter 36, a base current calculation unit 37, a high-order current calculation unit 38, two subtractors 39a and 39b, and two adders 40a and 40b. In the first embodiment, the high-order current calculation unit 38 and the adders 40a and 40b function as a current adjustment unit. The detection signal (rotation position θ) output from the position sensor 31 is input to the two-phase/three-phase converter 34 and the three-phase/two-phase converter 36, and the detection signals (actual current detection values Iuad, Ivad, Iwad) output from the current sensor 32 are input to the three-phase/two-phase converter 36.

The PI control unit 33 converts current to a d-axis component (component related to magnetic flux) and a q-axis component (component related to torque) and represented by a numerical value in a d-q axis coordinate system. The PI control unit 33 receives deviations ΔId and ΔIq of d and q-axis target current command values Id and Iq and d and q-axis current detection values Idad and Iqad. The PI control unit 33 generates the d and q-axis output signals Vd and Vq based on the input deviations ΔId and ΔIq to set such deviations to zero. Then, the PI control unit 33 outputs the d and q-axis output signals Vd and Vq to the two-phase/three-phase converter 34.

The two-phase/three-phase converter 34 converts the input d and q-axis output signals Vd and Vq from the PI control unit 33 to control signals Vu, Vv, and Vw respectively corresponding to the U-phase, V-phase, and W-phase based on the detection signal (rotation position θ of the rotor 20) from the position sensor 31. Then, the two-phase/three-phase converter 34 outputs the control signals Vu, Vv, and Vw. The inverter 35, which includes a bridge circuit that uses a plurality of switching elements, performs a switching operation based on the input control signals Vu, Vv, and Vw of the phases. As a result, a direct current (DC) power supply (battery) generates the excitation currents Iu, Iv, Iw for each phase and supplies the excitation currents Iu, Iv, Iw to the motor M (coil 12). That is, the excitation currents Iu, Iv, and Iw controlled to reach the present target values (target current command values Id and Iq) are generated and supplied to the motor M.

The excitation currents Iu, Iv, and Iw for each phase generated by the inverter 35 are detected by the current sensor 32 and input to the three-phase/two-phase converter 36 as detection signals (actual current detection values Iuad, Ivad, and Iwad). The three-phase/two-phase converter 36 converts the actual current detection values Iuad, Ivad, and Iwad to the d and q-axis current detection values Idad and Iqad in the d-q axis coordinate system based on the detection signal (rotation position θ of the rotor 20) from the position sensor 31. Then, the three-phase/two-phase converter 36 outputs the d-axis current detection value Idad to the subtractor 39a for d-axis and outputs the q-axis current detection value Iqad to the subtractor 39b for the q-axis. The subtractors 39a and 39b respectively subtract the d and q-axis current detection values Idad and Iqad from the input d and q-axis target current command values Id and Iq. Then, the subtractors 39a and 39b output the calculation result to the PI control unit 33 as deviations ΔId and ΔIq.

The d and q-axis target current command values Id and Iq are respectively calculated by the adders 40a and 40b based on the d and q-axis base current command values Id0 and Ig0 from the base current calculation unit 37 and d and q-axis high-order (he order) current command values Idhe, Iqhe from the high-order current calculation unit 38. The base current calculation unit 37 calculates the d and q-axis base current command values Id0 and Iq0 corresponding to the fundamental wave current (sinusoidal current). The high-order current calculation unit 38 refers to maps MP1 and MP2 to calculate the high-order current command values Idhe and Iqhe corresponding to the high-order current of a predetermined order (he) with respect to the fundamental wave current.

In other words, the high-order current calculation unit 38 stores the maps MP1 and MP2 for each d and q-axis and for each high-order current in advance. The high-order current calculation unit 38 refers to the maps MP1 and MP2 to obtain an amplitude and phase from the present command torque and the command rotation speed. The Maps MP1 and MP2 are obtained by analyzing experimental data between each one of amplitude and phase and between torque and rotation speed. Then, the high-order current calculation unit 38 calculates the high-order current command values Idhe and Iqhe, which reflect the amplitude and phase. The high-order current command values Idhe and Iqhe are set to realize a preferred reduction (cancellation) in the torque ripple of the same order. In other words, the maps MP1 and MP2 are formed to reduce (cancel) the torque ripple of a predetermined high-order component. The order (he) of the high-order current command values Idhe and Ighe is he=6k−3 (where k is a natural number). In the first embodiment, k=1, 2 is calculated. That is, the third order and ninth order is calculated. Thus, current command values for the third and ninth order components are calculated. This reduces the third and ninth order components of the torque ripple.

In the motor M of the first embodiment including the rotor 20, which is of a consequent pole (half magnet) type, the torque ripple was measured based on the flow of the fundamental wave current. In the motor M of the first embodiment, the present magnetic flux directivity and magnetic flux amount of the salient pole 22a functioning as the S pole changes. Thus, the torque ripple waveform differs from that of a normal full magnet type in which the magnetic poles of the rotor are all formed by magnets. More specifically, in the motor M of the first embodiment, the frequency increased by three times and nine times from the fundamental wave of the torque ripple waveform. That is, the third order component and ninth order component significantly appears in the motor M of the first embodiment. This shows that the third order component and ninth order component are unique to the consequent pole type.

Accordingly, the high-order current calculation unit 38 of the first embodiment calculates the high-order current command values Idhe and Iqhe for the third order and the ninth order of the d, q-axes that cancel the third order and ninth order components of the torque ripple. Further, the inverter 35, which is controlled based on the target current command values Id and Iq added to the current command values Idhe and Iqhe, generates the excitation currents Iu, Iv, and Iw, which preferably reduces the third order and ninth order components of the torque ripple, and supplies the excitation currents Iu, Iv, and Iq to the motor M.

Figure 3A:
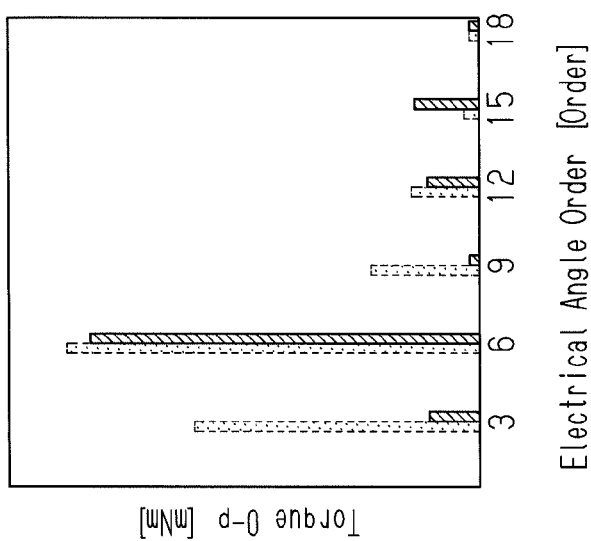
FIGS. 3A to 3C are graphs respectively showing the current waveform, the torque waveform, and the torque ripple for each high-order component in the controller of FIG. 2.
Figure 3B:
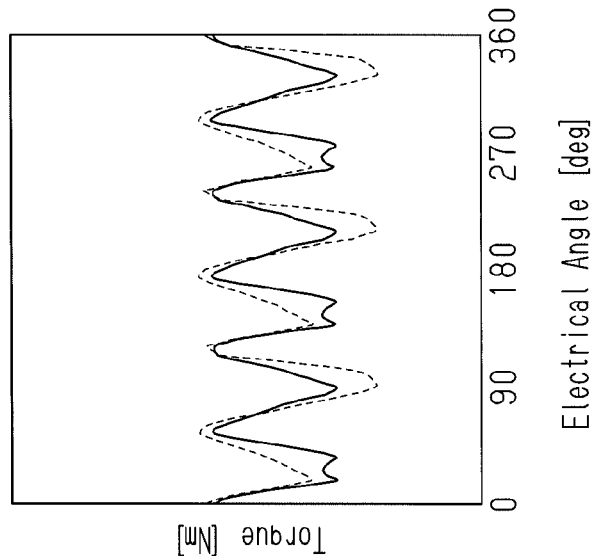

In FIG. 3A, a solid line indicates the change in current of the excitation currents Iu (Iv and Iw) when the present control is applied, that is, the current waveform in which the high-order currents of the third order and the ninth order are added to the fundamental wave current, which is indicated by a broken line. The excitation currents Iu, Iv, and Iw having such a waveform are supplied to the motor M (coil 12) to generate rotation torque having the waveform shown in FIG. 3B. In FIG. 3B, the broken line indicates the torque waveform of the motor M driven when supplied with the fundamental wave current, and the solid line indicates the torque waveform of the motor M driven by the supply of the excitation currents Iu, Iv, and Iw to which the high-order currents of the third order and the ninth order are added.

Figure 3C:
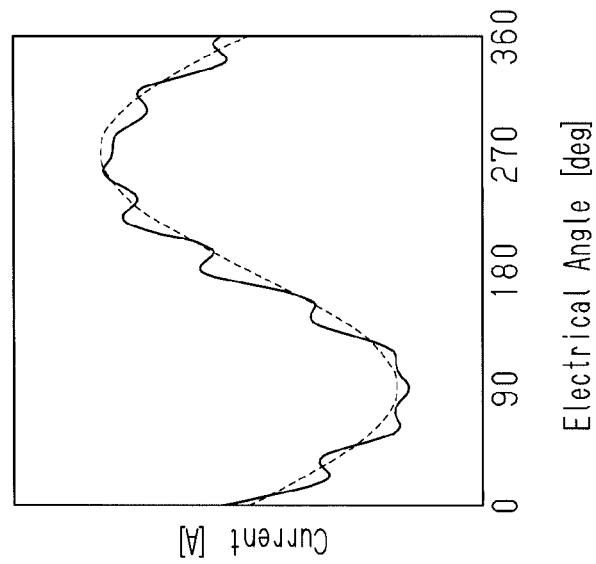
Figure 10:
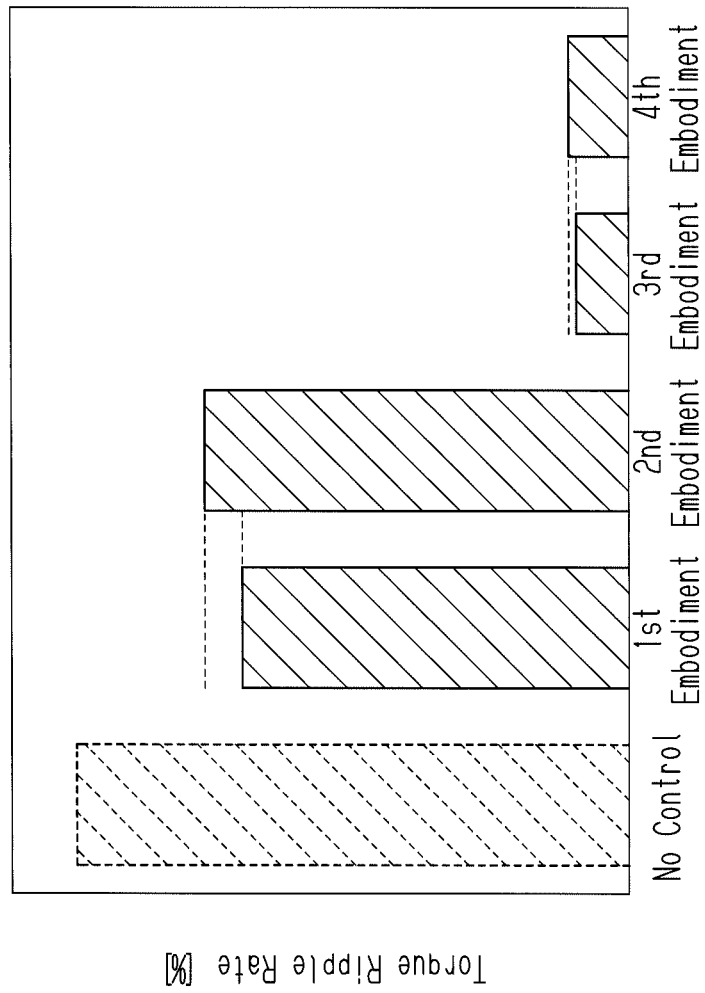
FIG. 10 is a graph comparing the torque ripple reduction effect by the first to fourth embodiments and a prior art structure to which the control of the present invention is not applied.

FIG. 3C shows the torque ripple (torque 0-P: torque zero to peak) for each high-order component. In FIG. 3C, the broken line indicates the torque ripple of the motor M based on the supply of the fundamental wave current. It is apparent that the third order and ninth order components are greatly reduced in the torque ripple of the motor M based on the supply of the excitation currents Iu, Iv, and Iw to which the high-order currents of the third order and ninth order components are added, as indicated by the solid line, compared to the torque ripple shown by the broken line. That is, the torque ripple of the motor M is decreased, and the vibration and noise of the motor M are reduced. FIG. 10 shows a comparison of the torque ripple rate of the first embodiment, the second to fourth embodiments, which will be discussed later, and a prior art structure, to which the present control is not applied. The comparison will be described when discussing each embodiment.

The first embodiment has the advantages described below.

(1) In the first embodiment, the high-order current calculation unit 38 and the adders 40a and 40b add the high-order currents (high-order current command values Idhe, Iqhe) of the third order and ninth order components in the d-axis and the q-axis to the fundamental wave current (base current command values Id0, Iq0) to reduce the torque ripple. In other words, the high-order current calculation unit 38 and the adders 40a and 40b form the current adjustment unit to adjust the fundamental wave current (base current command values Id0, Iq0) using the high-order currents (high-order current command values Idhe and Iqhe) of the third order and ninth order components in the d-axis and the q-axis. The excitation currents Iu, Iv, and Iw generated in this manner contain an element for reducing the torque ripple of the third order and ninth order components in both of the d and q-axes. This sufficiently reduces the torque ripple (see FIG. 3 and the first embodiment of FIG. 10) in the motor M supplied with the excitation currents Iu, Iv, and Iw. Further, vibration and noise of the motor M are also reduced.

(2) In the first embodiment, the configuration of the controller 30 is simplified since the current adjustment of two order components is carried out at the d and q-axes, respectively.

Second Embodiment

A second embodiment of the present invention will now be discussed with reference to the drawings.

As shown in FIG. 4, in a controller 30a of the second embodiment, the high-order current calculation unit 38 calculates the high-order current command value Iqhe of the third order and the ninth order that cancels the third order and ninth order components of the torque ripple only for the q-axis. Further, the high-order current calculation unit 38 adds the high-order current command value Iqhe to the q-axis target current command value Iq. Accordingly, the controller 30a of the second embodiment has a simplified structure in which the map MP1 and the adder 40a for the d-axis side used in the first embodiment are eliminated. In the second embodiment, the high-order current calculation unit 38 and the adder 40b function as the current adjustment unit.

Figure 5A:
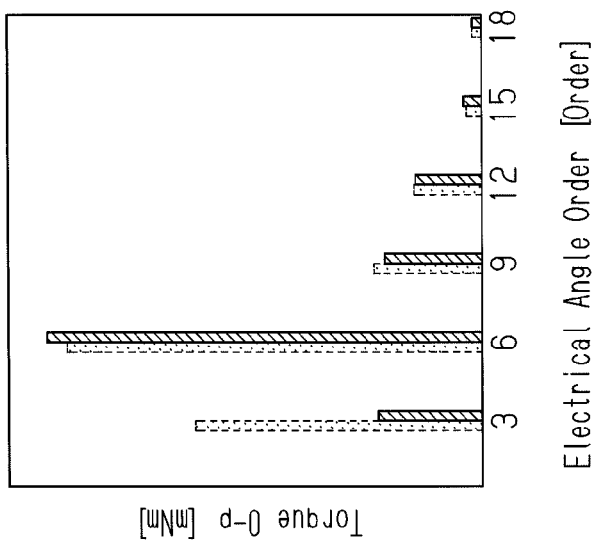
FIGS. 5A to 5C are graphs respectively showing the current waveform, the torque waveform, and the torque ripple for each high-order component in the controller of FIG. 4.
Figure 5B:
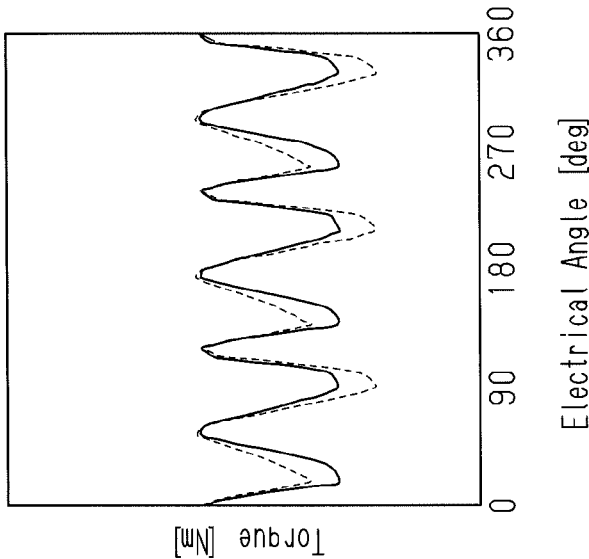

In FIG. 5A, a solid line indicates the change in current of the excitation currents Iu (Iv and Iw) when the present control is applied, that is, the current waveform in which the high-order currents of the third order and the ninth order (only q-axis) are added to the fundamental wave current, as indicated by a broken line. The rotation torque generated when the excitation currents Iu, Iv, and Iw of such waveform are supplied to the motor M (coil 12) has a waveform as shown in FIG. 5B. In FIG. 5B, the broken line indicates the torque waveform based on the supply of the fundamental wave current, and the solid line indicates the torque waveform based on the supply of the excitation currents Iu, Iv, and Iw to which the high-order currents of the third order and the ninth order are added.

Figure 5C:
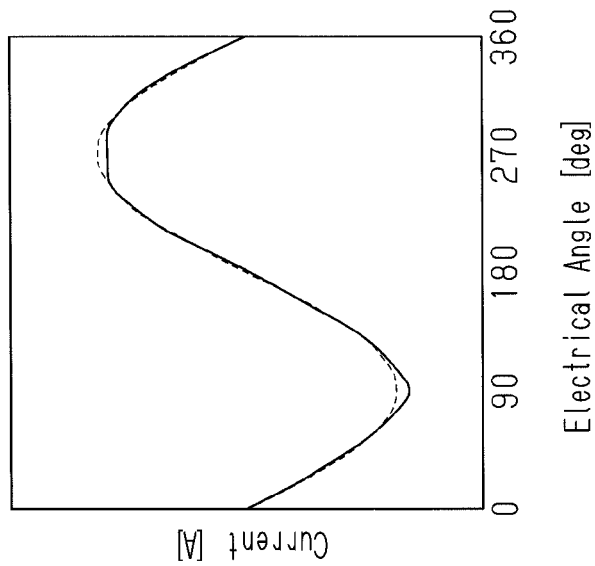

FIG. 5C shows the torque ripple (torque 0-P: torque zero to peak) for each high-order component. In FIG. 5C, the broken line indicates the torque ripple of the motor M based on the supply of the fundamental wave current. It is apparent that the third order component is significantly reduced and that the ninth order component is slightly reduced in the torque ripple of the motor M based on the supply of the excitation currents Iu, Iv, and Iw, to which the high-order currents of the third order and the ninth order indicated by the solid line are added, compared to the torque ripple shown by the broken line. That is, the structure of the controller 30a in the second embodiment may be simplified from the first embodiment, and the torque ripple of the motor M may be reduced, although as not as much as the first embodiment, as shown in FIG. 10. This reduces vibration and noise of the motor M.

The second embodiment has the advantages described below.

(1) The second embodiment adds and adjusts the high-order currents (high-order current command value Iqhe) of the third order and the ninth order at the q-axis to the fundamental wave current (base current command value Iq0) to reduce the torque ripple in the high-order current calculation unit 38 and the adder 40b. In other words, the high-order current calculation unit 38 and the adder 40b form the current adjustment unit to adjust the fundamental wave current (base current command value Iq0) using the high-order currents (high-order current command value Iqhe) of the third order and ninth order components at the q-axis. The excitation currents Iu, Iv, and Iw generated in such a manner contains an element for reducing the torque ripple of the third order and ninth order components in the q-axis. This reduces the torque ripple (see FIG. 5 and second embodiment of FIG. 10) in the motor M that receives the supply of the excitation currents Iu, Iv, and Iw. Further, vibration and noise of the motor M are also reduced.

(2) In the second embodiment, the structure of the controller 30a is simplified since the current adjustment of two order components is carried out only for the q-axis.

Third Embodiment

A third embodiment of the present invention will now be discussed with reference to the drawings.

Figure 6:
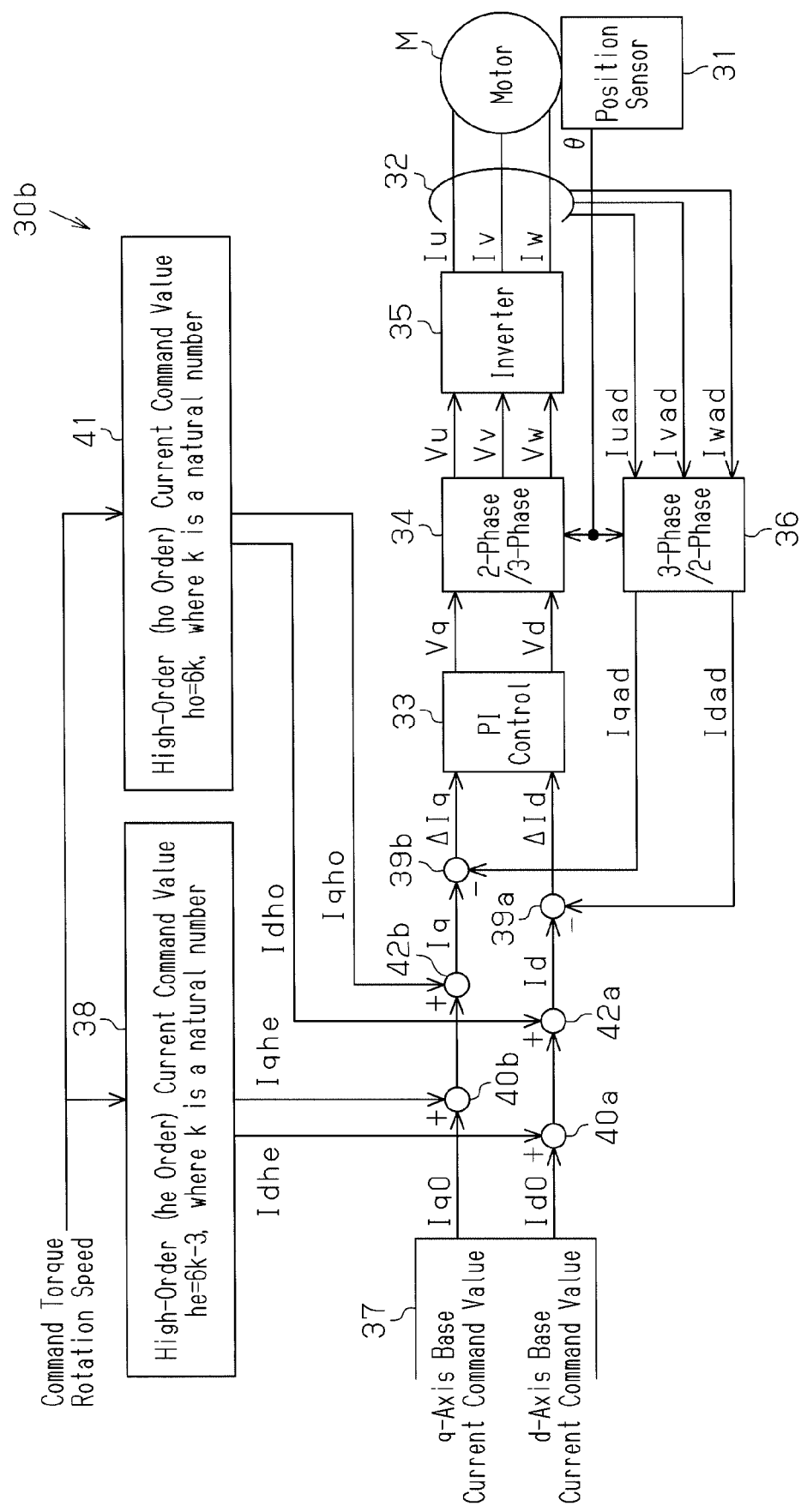
FIG. 6 is a block diagram of a controller according to the third embodiment of the present invention.

As shown in FIG. 6, in a controller 30b of the third embodiment, a high-order (ho order) current calculation unit 41 is used in addition to the high-order (he order) current calculation unit 38. The order (ho) of high-order current command values Idho and Iqho calculated by the high-order (ho order) current calculation unit 41 is ho=6k (k is a natural number). In the third embodiment, the current command values of k=1, 2, that is, the sixth order and twelfth order are calculated.

More specifically, in the controller 30b of the third embodiment, the high-order (he order) current calculation unit 38 calculates the high-order current command values Idhe and Iqhe of the third order and the ninth order for d and q-axes that cancel the third order and ninth order components of the torque ripple. In addition, the high-order (ho order) current calculation unit 41 calculates the high-order current command values Idho and Iqho of the sixth order and the twelfth order for the d and q-axes that cancel the sixth order and twelfth order components of the torque ripple. The high-order current calculation unit 41 also includes maps MP1 and MP2 of d and q-axes for the sixth order and twelfth order components that are similar to the maps MP1, MP2 shown in FIG. 2. Further, the high-order current calculation unit 41 refers to the maps MP1 and MP2 to calculate the high-order current command values Idho and Iqho of the sixth order and the twelfth order from the present command torque and the command rotation speed. The high-order current command values Idhe and Iqhe of the third order and the ninth order are input to the adders 40a and 40b. The high-order current command values Idho and Iqho of the sixth order and the twelfth order are input to the adders 42a and 42b, which are then added to the base current command values Ip0 and Id0 to calculate the d and q-axis target current command values Id and Iq. In the third embodiment, the high-order current calculation units 38 and 41 and the adders 40a, 40b, 42a, and 42b function as a current adjustment unit.

The third order and ninth order components of the torque ripple based on the flow of the fundamental wave current are unique components generated in the consequent pole motor M of the third embodiment, whereas a sixth order and twelfth order components are generated not only in a consequent pole motor but also in a full magnet motor. That is, in the third embodiment, the reduction of the torque ripple of the sixth order and twelfth order components is achieved in addition to the reduction of the torque ripple of the third order and ninth order components of the torque ripple.

Figure 7A:
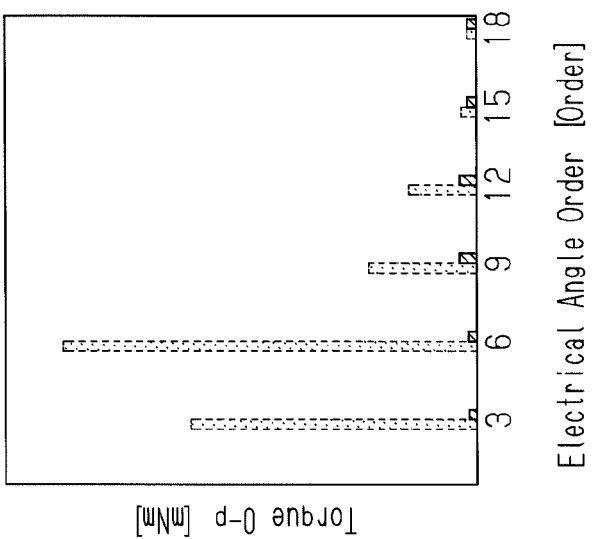
FIGS. 7A to 7C are graphs respectively showing the current waveform, the torque waveform, and the torque ripple for each high-order component in the controller of FIG. 6.
Figure 7B:
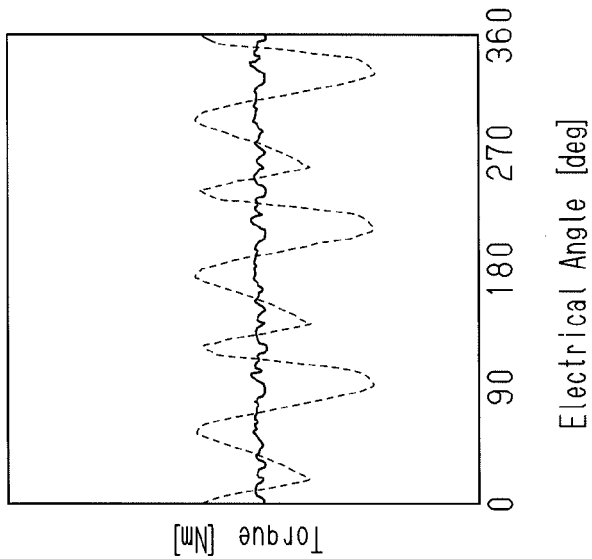

In FIG. 7A, a solid line indicates the change in the excitation currents Iu (Iv, Iw) when applying the present control. That is, in FIG. 7A, the current waveform in which the high-order currents of the third order, ninth order, sixth order and twelfth order (d and q-axes) are added to the fundamental wave current are indicated by a broken line. The rotation torque generated when the excitation currents Iu, Iv, and Iw of such a waveform are supplied to the motor M (coil 12) has a waveform shown in FIG. 7B. In FIG. 7B, the broken line indicates the torque waveform based on the supply of the fundamental wave current, and the solid line indicates the torque waveform based on the supply of the excitation currents Iu, Iv, and Iw in which the high-order currents of the third order, ninth order, sixth order and twelfth order are added. The width in change for the latter is very small.

Figure 7C:
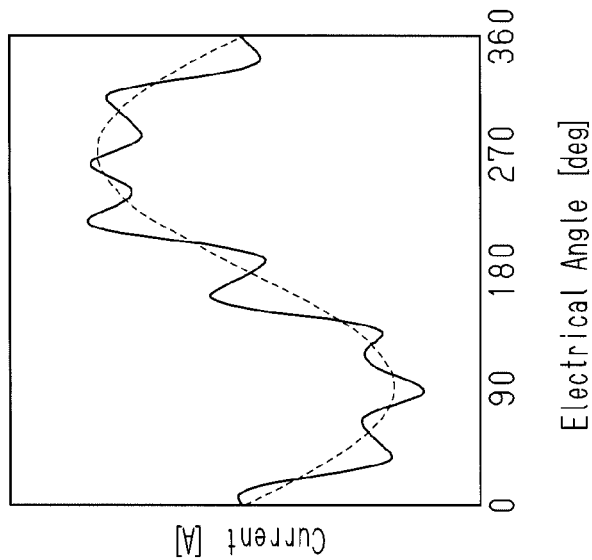

FIG. 7C shows the torque ripple (torque 0-P: torque zero to peak) for each high-order component. In FIG. 7C, the broken line indicates the torque ripple of the motor M based on the supply of the fundamental wave current. It is apparent that when comparing the torque ripple indicated by the broken line with the torque ripple of the motor M based on the supply of the excitation currents Iu, Iv, Iw to which the high-order currents of the third order, ninth order, sixth order and twelfth order are added as indicated by the solid line, the third order, ninth order, sixth order, and twelfth order components are more drastically reduced than the first and second embodiments. That is, the torque ripple of the motor M is further reduced in the third embodiment. As shown in FIG. 10, the torque ripple of the motor M may be further reduced from the first and second embodiments, and vibration and noise of the motor M are reduced.

The third embodiment has the advantages described below.

(1) In the third embodiment, the high-order current calculation units 38 and 41 and the adders 40a, 40b, 42a, and 42b add the high-order currents (high-order current command values Idhe, Iqhe, Idho, and Iqho) for the third order, ninth order, sixth order and twelfth order components in the d-axis and q-axis to the fundamental wave current (base current command values Id0 and Iq0) to reduce the torque ripple. In other words, the high-order current calculation units 38 and 41 and the adders 40a, 40b, 42a, and 42b of the current adjustment unit adjust the fundamental wave current (base current command values Id0, Iq0) using the high-order currents (high-order current command values Idhe, Iqhe, Idho, and Iqho) of the third order, ninth order, sixth order and twelfth order components in the d-axis and the q-axis. The excitation currents Iu, Iv, and Iw generated in such a manner contain an element for reducing the torque ripple of the third order, ninth order, sixth order and twelfth order components in both of the d and q-axes. This further reduces the torque ripple (see FIG. 7 and third embodiment of FIG. 10) in the motor M that receives the supply of the excitation currents Iu, Iv, and Iw, and reduces vibration and noise of the motor M.

(2) In the third embodiment, the current adjustment for four order components is performed for the d and q-axes. This simplifies the structure of the controller 30b.

Fourth Embodiment

A fourth embodiment of the present invention will now be discussed with reference to the drawings.

Figure 8:
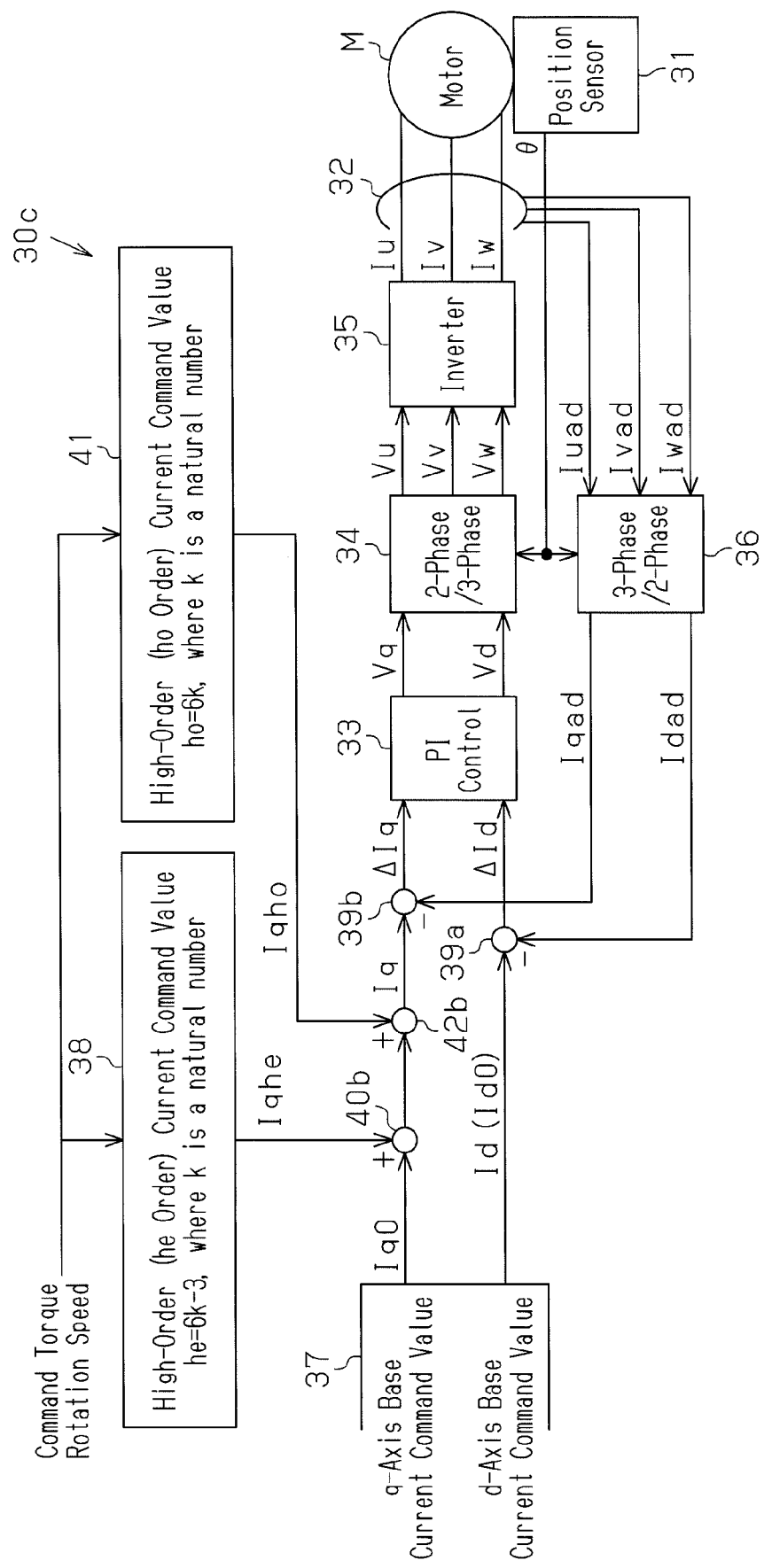
FIG. 8 is a block diagram of a controller according to a fourth embodiment of the present invention.

As shown in FIG. 8, in the fourth embodiment, the high-order (he order) current calculation unit 38 in a controller 30c calculates, for only the q-axis, the high-order current command value Iqhe for the third order and the ninth order that cancels the third order and ninth order components of the torque ripple. In addition, the high-order (ho order) current calculation unit 41 calculates, for only the q-axis, the high-order current command value Iqho of the sixth order and the twelfth order that cancels the sixth order and twelfth order components of the torque ripple. The high-order current command value Iqhe and the high-order current command value Iqho are added to the q-axis target current command value Iq. Thus, the controller 30c of the fourth embodiment has a simple structure in which the map MP1 and the adders 40a and 42a for the d-axis side that are used in the third embodiment are eliminated. In the fourth embodiment, the high-order current calculation units 38 and 41 and the adders 40b and 42b function as a current adjustment unit.

Figure 9A:
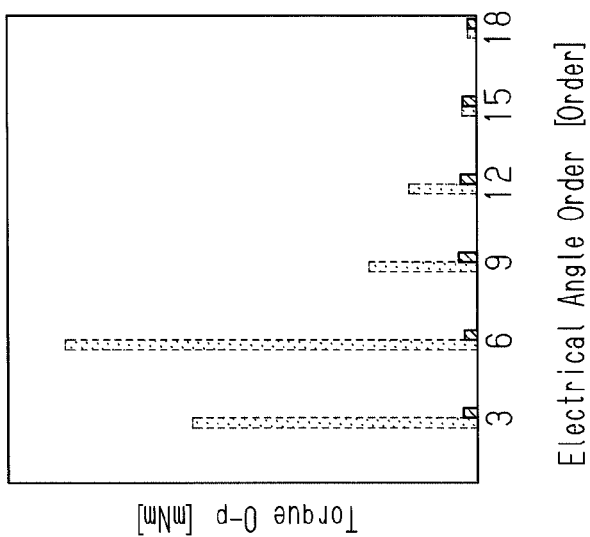
FIGS. 9A to 9C are graphs respectively showing the current waveform, the torque waveform, and the torque ripple for each high-order component in the controller of FIG. 8.
Figure 9B:
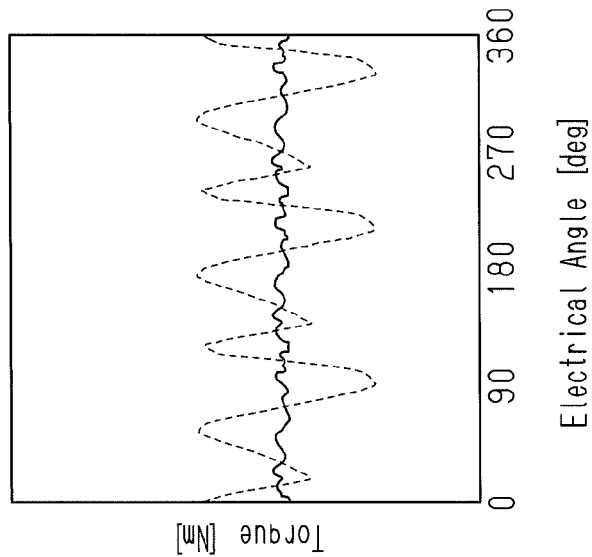

In FIG. 9A, a solid line indicates the change in current of the excitation currents Iu (Iv and Iw) when applying the present control, that is, the current waveform in which the high-order currents of the third order, ninth order, sixth order and twelfth order (only q-axis) are added to the fundamental wave current as indicated by a broken line. The rotation torque generated when the excitation currents Iu, Iv, and Iw of such waveform are supplied to the motor M (coil 12) has a waveform shown in FIG. 9B. In FIG. 9B, the broken line indicates the torque waveform based on the supply of the fundamental wave current, and the solid line indicates the torque waveform based on the supply of the excitation currents Iu, Iv, and Iw to which the high-order currents of the third order, ninth order, sixth order and twelfth order are added.

Figure 9C:
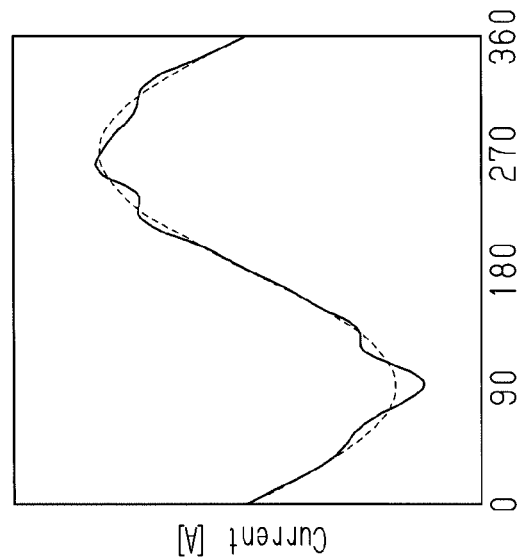

FIG. 9C shows the torque ripple (torque 0-P: torque zero to peak) for each high-order component. In FIG. 9C, the broken line indicates the torque ripple of the motor M based on the supply of the fundamental wave current. It is apparent that when comparing the torque ripple indicated by the broken line with the torque ripple of the motor M based on the supply of the excitation currents Iu, Iv, Iw to which the high-order currents of the third order, ninth order, sixth order, and twelfth order are added as indicated by the solid line, the third order, ninth order, sixth order, and twelfth order components are more drastically reduced in the same manner as the third embodiment. That is, in the fourth embodiment, the structure of the controller 30c is simplified from the third embodiment. Moreover, the torque ripple of the motor M is further reduced, although as not as much as the third embodiment, as shown in FIG. 10. This reduces vibration and noise of the motor M.

The fourth embodiment has the following advantages.

(1) In the fourth embodiment, the high-order current calculation units 38 and 41 and the adders 40b and 42b add the high-order currents (high-order current command values Iqhe, Iqho) of the third order, ninth order, sixth order, and twelfth order components at the q-axis to the fundamental wave current (base current command value Iq0) to reduce the torque ripple. In other words, the high-order current calculation units 38 and 41 and the adders 40b, 42b form the current adjustment unit to adjust the fundamental wave current (base current command value Iq0) using the high-order currents (high-order current command values Idhe, Iqhe, Idho, Iqho) for the third order, ninth order, sixth order, and twelfth order components in the q-axis. The excitation currents Iu, Iv, and Iw generated in this manner contain an element for reducing the torque ripple of the third order, ninth order, sixth order, and twelfth order components at the q-axis. This further reduces the torque ripple (see FIG. 9 and fourth embodiment of FIG. 10) in the motor M that receives the supply of the excitation currents Iu, Iv, and Iw, and reduces vibration and noise of the motor M.

(2) In the fourth embodiment, the current adjustment for four order components is carried for only the q-axis. This simplifies the structure of the controller 30c.

It should be apparent to those skilled in the art that the present invention may be embodied in many other specific forms without departing from the spirit or scope of the invention. Particularly, it should be understood that the present invention may be embodied in the following forms.

In the first to fourth embodiments, the current adjustment is carried out on the high-order component for each of the third order and the ninth order (he order). However, the current adjustment may be carried out for just one of the third order and the ninth order. Other components that satisfy he=6k−3 (when k is a natural number) may also be the subject of adjustment. Such schemes may also be used in combination.

In the third and fourth embodiments, the sixth order and twelfth order (ho order) components are also the subject of current adjustment and the current adjustment is carried out on both high-order components. However, the adjustment may be carried out for just one of the sixth order and the twelfth order. Other components that satisfy h0=6k (where k is a natural number) may also be the subject of adjustment. Such schemes may also be used in combination.

In the first to fourth embodiments, the motor M including the rotor 20, which has eight magnetic poles, and the stator 10, which has twelve coils 12, is the control subject. However, a motor of a different structure that satisfies the relationship between the number of magnetic poles of the rotor and the number of coils (number of slots) of the stator of 4n:3m (n, m are natural numbers) may be the control subject.

The present examples and embodiments are to be considered as illustrative and not restrictive, and the invention is not to be limited to the details given herein, but may be modified within the scope and equivalence of the appended claims.

What is claimed is:

1. A controller for use with a motor including a stator, around which three-phase coils are wound, and a rotor, which includes a magnet functioning as a first magnetic pole and a salient pole of a core functioning as a second magnetic pole, for supplying the three-phase coils with excitation currents having a predetermined phase difference from one another to drive and rotate the rotor, the controller comprising:
a current adjustment unit that adjusts a fundamental wave current using high-order currents for third order and ninth order components in a q-axis to reduce torque ripple, wherein the excitation current is generated based on the fundamental wave current adjusted by the current adjustment unit.

2. The controller according to claim 1, wherein the current adjustment unit adjusts the fundamental wave current using high-order currents for third order and ninth order components in a d-axis in addition to the high-order currents for the third order and ninth order components in the q-axis.

3. The controller according to claim 1, wherein the current adjustment unit adjusts the fundamental wave current using high-order currents for sixth order and twelfth order components in the q-axis in addition to the high-order currents for the third order and ninth order components in the q-axis.

4. The controller according to claim 3, wherein the current adjustment unit adjusts the fundamental wave current using high-order currents for third order, ninth order, sixth order and twelfth order components in a d-axis in addition to the high-order currents for the third order, ninth order, sixth order, and twelfth order components in the q-axis.

5. The controller according to claim 1, wherein the motor that is subject to control has a structure including a number of magnetic poles and number of coils in a relationship of 4n:3m, where n and m are natural numbers.

6. A controller for use with a motor including a stator, around which three-phase coils are wound, and a rotor, which includes a magnet functioning as a first magnetic pole and a salient pole of a core functioning as a second magnetic pole, for supplying the three-phase coils with excitation currents having a predetermined phase difference from one another to drive and rotate the rotor, the controller comprising:
a current adjustment unit that adjusts a fundamental wave current using a high-order current of an he order component in, among a d-axis and a q-axis, at least the q-axis to reduce torque ripple, in which he=6k−3 and k is a natural number, wherein the excitation currents are generated based on the fundamental wave current adjusted by the current adjustment unit.

7. The controller according to claim 6, wherein the current adjustment unit uses a high-order current of an ho order component in a d-axis in addition to the high-order current for the he order component in the q-axis to adjust the fundamental wave current, in which ho=6k and k is a natural number.

* * * * *